June 15, 1937.  W. J. BENCE  2,083,814
FISHERMAN'S BAIT REPLACING AND LINE FREEING DEVICE
Filed May 27, 1936
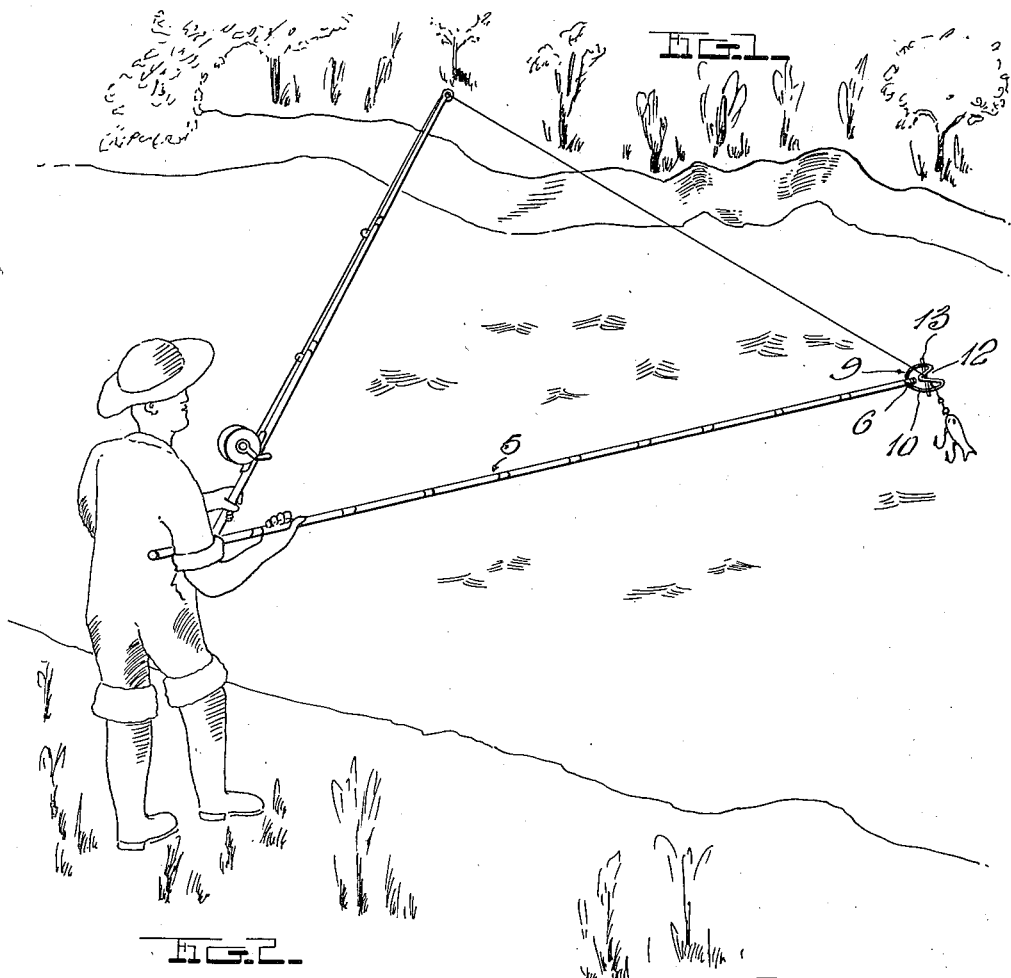
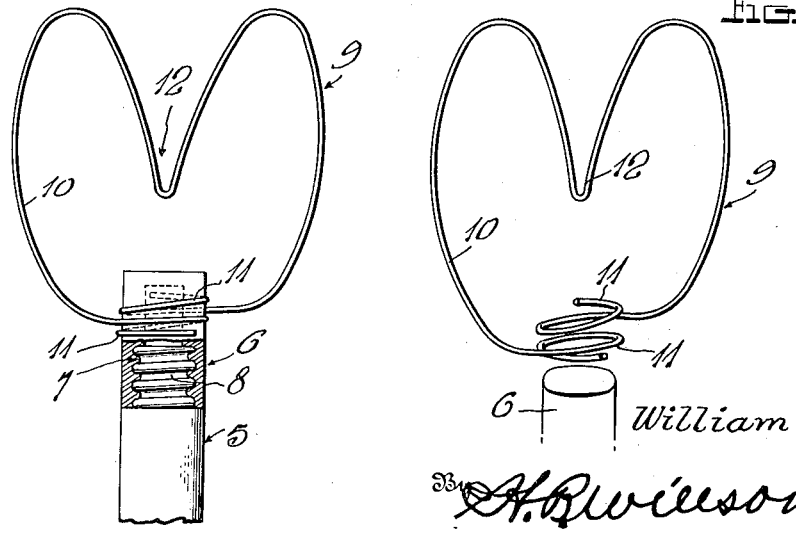
Inventor
William J. Bence Patented June 15, 1937

2,083,814

UNITED STATES PATENT OFFICE 2,083,814

FISHERMAN'S BAIT REPLACING AND LINE-FREEING DEVICE

William J. Bence, Kingston, N. Y.

Application May 27, 1936, Serial No. 82,112

3 Claims. (Cl. 43—1)

When casting with live bait, the bait is often torn from the line, or is killed upon striking the water. Moreover, the line, whether using live or artificial bait, often becomes caught on roots, rocks, or other submerged objects, frequently causing loss of the bait and very often necessitating cutting of the line and consequent loss of hook, spinner, etc.

My invention aims to provide a novel device whereby the baited end of the line may be pushed to the desired point and then released, thereby gently placing the bait where desired, without casting, and it further aims to provide a device which may be successfully used in freeing the line if caught on some submerged object.

With the foregoing in view, the invention resides in the novel subject matter hereinafter described and claimed, description being accomplished by reference to the accompanying drawing.

Fig. 1 is a perspective view showing the manner of using the device in placing the bait at the desired point without casting.

Fig. 2 is a fragmentary side elevation, partly broken away and in section showing the line pushing device and the means for attaching it to the front end of a sectional pole.

Fig. 3 is a perspective view showing the wire pushing device and the pole tip in juxtaposition.

A preferred construction has been shown and will be specifically described, with the understanding, however, that variations may be made within the scope of the invention as claimed.

I provide a pole 5 preferably of bamboo or steel and of sectional form, said pole being of any desired length but preferably about thirty feet. A detachable tip 6 is provided for the front end of the pole 5, said tip being preferably provided with a rearwardly open socket 7 to receive a threaded stud 8 on the pole. The tip 6 is preferably of substantially cylindrical form and it may be formed from wood or metal as desired, wood however, being preferable.

A length of wire 9 of rather stiff, yet somewhat yieldable nature, is bent to form a loop 10, the ends of the wire being bent to provide coils 11 at the rear of the loop, which coils tightly surround the pole tip 6 to attach said loop to said tip. The front portion of the loop 10 is bent inwardly in a rearward direction to provide a V-shaped crotch 12 for receiving and pushing the line.

When using the device, to place the bait at a desired point, a match stem or the like 13 is preferably tied on the line 14 a short distance above the bait and the line is then laid in the crotch 12 with the match stem or the like engaging said crotch as shown in Fig. 1. Then, by pushing the pole 5, a desired amount of the line may be pushed over or into the stream and the bait placed at the desired location, the line-pushing device being readily disengageable from the line, simply by pulling the former rearwardly.

Should the line become caught on some submerged object, the pole 5 and the crotched loop at the front thereof, may be readily used to dislodge the line, simply by so handling the pole as to engage the crotch 12 with the line and then pushing upon the latter until it is freed. The crotch may readily travel down the line until it reaches the point at which the line or hook is caught, transmitting the push at the most advantageous place.

It will be seen from the foregoing that novel and inexpensive provision has been made for carrying out the objects of the invention, and while preferred details have been disclosed, attention is again invited to the possibility of making variations within the scope of the invention as claimed. Obviously, the sectional pole may be disassembled for easy carrying. The wire loop and the attached pole tip 6 may either be carried in the fisherman's pocket or in the usual kit.

I claim:—

1. A device of the class described comprising a length of wire bent to form a loop, said wire having its ends bent to form coils to snugly surround the front end of a pole to attach said loop to the pole, a portion of said loop being bent inwardly to provide a V-shaped line-pushing crotch, said crotch being open to allow it to be readily withdrawn from the line.

2. A device of the class described comprising a pole tip having means at its rear end for attaching it to a pole, and a length of wire bent into the form of a loop, said wire having its ends bent to form coils, said coils snugly surrounding said pole tip to secure the loop thereto, a portion of said loop being bent inwardly to provide a V-shaped line-pushing crotch, said crotch being open to allow it to be readily withdrawn from the line.

3. A device of the class described comprising a length of wire bent to form a loop, portions of said wire being bent to form means at the rear end of the loop for attaching the same to the forward extremity of a pole, the forward portion of said loop being bent inwardly to provide a V-shaped line-pushing crotch, said crotch being forwardly open to allow it to be rearwardly withdrawn from the line.

WILLIAM J. BENCE.